United States Patent [19]

Shibuya et al.

[11] 4,392,353
[45] Jul. 12, 1983

[54] METHOD OF RECOVERING EXHAUST GAS FROM BOILER IN ELECTRICAL POWER GENERATING DEVICE USING COMBUSTIBLE MATERIAL AS FUEL AND APPARATUS FOR PERFORMING SUCH METHOD

[75] Inventors: Kyoichi Shibuya, Matsudo; Tomomi Ihara, Narashino, both of Japan

[73] Assignee: Sumitomo Semento Kabushiki Kaisha, Japan

[21] Appl. No.: 308,531

[22] PCT Filed: Feb. 13, 1981

[86] PCT No.: PCT/JP81/00028
§ 371 Date: Oct. 15, 1981
§ 102(e) Date: Sep. 30, 1981

[87] PCT Pub. No.: WO81/02257
PCT Pub. Date: Aug. 20, 1981

[30] Foreign Application Priority Data

Feb. 15, 1980 [JP] Japan .................. 55-016535

[51] Int. Cl.³ .............. F01K 15/00; F27B 15/00
[52] U.S. Cl. ...................... 60/657; 60/670; 432/14
[58] Field of Search ............. 60/646, 648, 657, 670; 110/203, 204; 432/14, 106

[56] References Cited

U.S. PATENT DOCUMENTS

| | | | |
|---|---|---|---|
| 2,498,710 | 2/1950 | Roetheli | 432/14 X |
| 4,045,162 | 8/1977 | Christiansen | 432/14 |
| 4,071,309 | 1/1978 | Yamane | 432/14 |
| 4,126,000 | 11/1978 | Funk | 60/648 |

Primary Examiner—Allen M. Ostrager
Assistant Examiner—Stephen F. Husar
Attorney, Agent, or Firm—Kane, Dalsimer, Kane, Sullivan and Kurucz

[57] ABSTRACT

A method of and apparatus for recovering exhaust gas from a boiler 2 of a thermal electric power generating device 1 are disclosed. The exhaust gas from the boiler 2 is fed through a conduit 30 to a preheat section 21 of a powder raw material treating device 20. The heat of the exhaust gas is recovered as a heat source for preheating the powder raw material. The ash contained in the exhaust gas is recovered as part of the powder raw material at the preheat section. The sulfur oxides in the exhaust gas react with the desulfurizing component of the power raw material at the preheat section, and its reaction product is recovered as part of the powder raw material.

8 Claims, 12 Drawing Figures

METHOD OF RECOVERING EXHAUST GAS FROM BOILER IN ELECTRICAL POWER GENERATING DEVICE USING COMBUSTIBLE MATERIAL AS FUEL AND APPARATUS FOR PERFORMING SUCH METHOD

FIELD OF THE INVENTION

This invention relates to a method of recovering exhaust gas produced when combustible material is burned to produce electric power and an apparatus for performing such a method.

BACKGROUND ART

Generally, in the thermal power generation, combustible solids such as coal and oil shale, or combustible liquids such as heavy oil and waste oil are used as a fuel. One difficulty encountered in a conventional thermal power plant has been the problem of treating exhaust gas from an associated boiler in which the fuel is burned.

One reason for this is that the temperature of the exhaust gas has to be controlled at a stage prior to the dust removing stage since the exhaust gas is maintained usually at a relatively high temperature of about 300° C. at the outlet of the boiler of the thermal electric power generating device. Another reason is that a desulfurizing device has to be provided for removing oxides of sulfur from the exhaust gas. A further reason is that it has been difficult to treat the ash contained in the exhaust gas. Particularly, where the desulfurizing device is installed, a difficulty has arisen from the fact that the overall construction cost of the thermal power plant is high. Another disadvantage has been that the amount of a desulfurizing agent to be used is large. A further disadvantage has been that it is difficult to treat the products formed by the reaction of the desulfurizing agent with the sulfur oxides, as is the case with the treatment of the ash in the exhaust gas. Particularly where coal is used as a fuel in the production of electric power, the problem of treating the ash and the sulfur oxides has become more and more serious.

It is an object of this invention to provide a method of using exhaust gas from an electric power generating device as a heat source and efficiently treating the ash contained in the exhaust gas.

Another object is to provide a method of efficiently treating sulfur oxides contained in the exhaust gas without the use of a special desulfurizing device.

A further object is to provide an apparatus for performing such methods.

DISCLOSURE OF THE INVENTION

In the method according to the invention, exhaust gas from a boiler of an electric power generating device is fed to a preheat section of a powder raw material treating device. The ash contained in the exhaust gas is recovered as part of the powder raw material, and the exhaust gas is recovered as part of a heat source for preheating the powder raw material. The powder raw material may contain a desulfurizing component to remove the sulfur oxides from the exhaust gas.

In the apparatus according to the invention, a thermal electric power generating device and a powder raw material sintering device are connected by an exhaust gas conduit. The thermal electric power generating device comprises a boiler, a heat exchange water pipe arranged in the boiler, a turbine rotated by the steam from the water pipe, and a power generator actuated by the rotation of the turbine. The powder raw material sintering device comprises a preheat section, a sintering section connected to the preheat section, and a cooling section connected to the sintering section. The outlet of the boiler of the electric power generating device and the preheat section are connected by the exhaust gas conduit.

DESCRIPTION OF THE PREFERRED EMBODIMENTS OF THE INVENTION

The invention will now be described with reference to the accompanying drawings. In all of the embodiments of the invention described below, coal is used as a fuel for thermal power generation, and cement powder raw material is used as a powder raw material.

Figure 1:
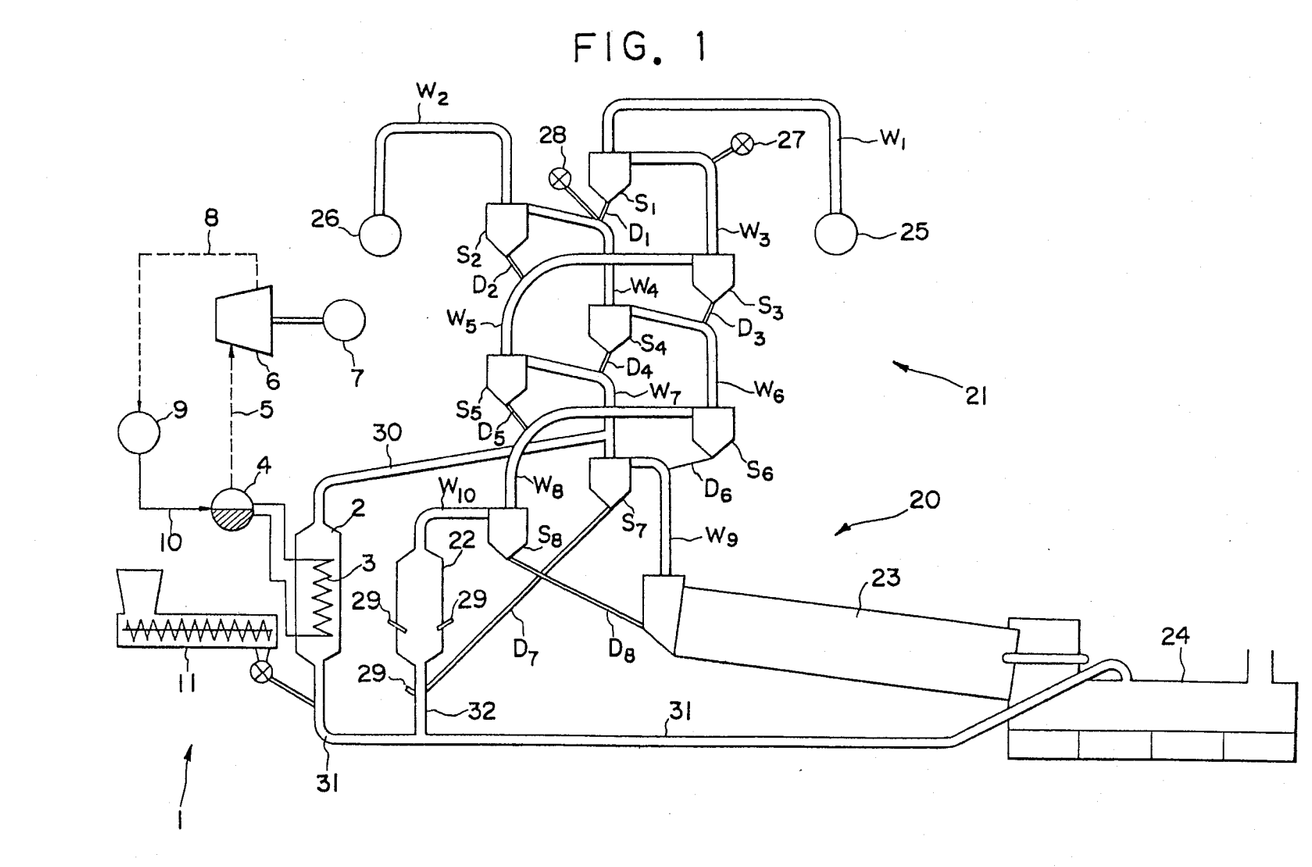
FIG. 1 is a diagrammatic elevational view of an apparatus for recovering exhaust gas from a combustion furnace in a thermal electric power generating device, the apparatus being provided in accordance with a first embodiment of the invention in which the exhaust gas is fed to a duct of a suspension preheater of a powder raw material sintering device through a conduit.

FIG. 1 shows an apparatus provided in accordance with one embodiment of the invention. In FIG. 1 a thermal electric power generating device 1 is shown at the left hand, and a sintering device 20, which serves as a heat treatment device for cement powder raw material, is shown at the right hand. The thermal electric power generating device 1 and the sintering device 20 are connected by a conduit 30 which delivers exhaust gas from the thermal electric power generating device 1.

The thermal electric power generating device 1 has a boiler 2 of the fluidizing type. A water pipe 3 is arranged within the boiler 2. The opposite ends of the water pipe 3 extend outwardly of the boiler 2 and are connected to a drum 4. Water circulating through the water pipe 3 is heated within the boiler 2 to produce steam. This steam is fed to a steam turbine 6 through the drum 4 and a steam pipe 5 to rotate the steam turbine 6. The rotation of the steam turbine causes an electric power generator 7 to operate so as to produce electric power. The steam discharged from the steam turbine 6 is fed through a steam pipe 8 to a condenser 9 in which the steam is converted to water. This water is again fed to the water pipe 3 through a water pipe 10 and the drum 4. The lower end of the boiler 2 is connected by a duct 31 to a cooling device 24 mentioned below. Hot air, produced when cooling the clinker in the cooling device 24, is fed to the boiler 2 through the duct 31. A coal feeder 11 is connected to that portion of the duct 31 near the lower end of the boiler 2. In this embodiment coal supplied from the coal feeder 11 is pulverized so as to be in the form of fine particles or powder. This pulverized coal is preheated by the hot air flowing through the duct 31 and is transferred upwardly to the boiler 2 with part of the coal gasified. In the boiler, the coal is substantially burned by an excessive amount of hot air.

The sintering device 20 for the cement powder raw material comprises a suspension preheater 21 as a preheat section, a rotary kiln 23 as a sintering section, and the cooling device 24 as a cooling section.

The suspension preheater 21 comprises a calcining furnace 22 and two units each consisting of ducts and cyclones. The ducts of the first unit are designated at $W_1$, $W_3$, $W_5$, $W_7$, $W_9$, and the cyclones are designated at $S_1$, $S_3$, $S_5$, $S_7$. The ducts of the second unit are designated at $W_2$, $W_4$, $W_6$, $W_8$, $W_{10}$, and the cyclones are designated at $S_2$, $S_4$, $S_6$, $S_8$. Each cyclone of each unit is connected between the adjacent ducts. The uppermost ducts $W_1$, $W_2$, of the two units have their one ends connected to respective exhausters 25, 26. The lowermost duct $W_9$ of the first unit has its lower end connected to the rotary kiln 23. The lowermost duct $W_{10}$ of the second unit has its lower end connected to the upper end of the calcining furnace 22. The hot gas from the rotary kiln 23 is passed through the ducts $W_9$, $W_7$, $W_5$, $W_3$, $W_1$, and cyclones $S_7$, $S_5$, $S_3$, $S_1$, of the first unit and discharged from the exhauster 25. The hot gas from the calcining furnace 22 is passed through the ducts $W_{10}$, $W_8$, $W_6$, $W_4$, $W_2$ and cyclones $S_8$, $S_6$, $S_4$, $S_2$ and discharged from the exhauster 26.

In the suspension preheater 21, each of the cyclones of the two units (except for the lowermost cyclones $S_7$, $S_8$) is connected at its bottom by a raw material feed pipe to the duct of the different unit disposed below it. The raw material feed pipes are designated at $D_1$ to $D_6$. The lowermost cyclone $S_7$ of the first unit is connected at its bottom to a duct 32 by a raw material feed pipe $D_7$. The duct 32 is connected between the duct 31 and the calcining furnace 22 whereby the hot gas from the cooling device 24 is also supplied to the calcining furnace 22. The lowermost cyclone $S_8$ of the second unit is connected at its bottom to the rotary kiln 23 by a raw material feed pipe $D_8$.

In the suspension preheater 21, raw material supplying devices (only feed ports 27, 28 of which are shown in the drawings) are connected to the ducts $W_3$, $W_4$, of the two units, respectively. A cement powder raw material supplied from the raw material supplying device 27 of the first unit is fed to the duct $W_3$ of the first unit, and is delivered by the hot gas, passing therethrough, to the cyclone $S_1$ where the raw material is gathered. The gathered raw material is discharged from the bottom of the cyclone $S_1$ and is fed through a raw material feed pipe $D_1$ to the duct $W_4$ of the second unit. The raw material is then fed through the cyclone $S_2$, a raw material feed pipe $D_2$, the duct $W_5$, the cyclone $S_3$, a raw material feed pipe $D_3$, the duct $W_6$, the cyclone $S_4$, a raw material feed pipe $D_4$, the duct $W_7$, the cyclone $S_5$, a raw material feed pipe $D_5$, the duct $W_8$, the cyclone $S_6$, a raw material feed pipe $D_6$, and the duct $W_9$ into the cyclone $S_7$. A raw material supplied from the raw material supplying device 28 of the second unit is fed to the duct $W_4$ of the second unit in which this raw material is joined to the raw material supplied from the raw material supplying device of the first unit. The joined raw material is fed through the same path to the cyclone $S_7$. As described above, the raw material is preheated by the hot gas passing through the ducts of the two units while the raw material passes through the ducts of the two units in an alternate fashion.

The raw material, which has reached the cyclone $S_7$, is delivered to the duct 32 through a raw material feed pipe $D_7$ and further fed to the calcining furnace 22 by the hot air discharged from the cooling device 24 and passing upwardly through the duct 32. The raw material is calcined in the calcining furnace 22. This calcination is carried out by the combustion of heavy oil or the like injected from a burner 29 provided on the duct 32 and burners 29 provided on the calcining furance 22.

As described above, the calcined raw material moves upwardly together with the hot gas and passes through the duct $W_{10}$, the cyclone $S_8$ and the raw material feed pipe $D_8$ to the rotary kiln 23 where the raw material is sintered to form a clinker. This clinker is fed to the cooling device 24 where it is cooled.

A feature of this invention is that a conduit 30 is connected to the preheat section of the heat treatment device for the powder raw material for transferring the exhaust gas from the boiler 2 of the electric power generating device 1. In the embodiment shown in FIG. 1, the conduit 30 is connected to the duct $W_7$ of the first unit in the suspension preheater 21. The exhaust gas from the boiler 2 of the electric power generating device 1 passes through the conduit 30 to the duct $W_7$ in which the exhaust gas is joined to the hot gas from the rotary kiln 23. The exhaust gas is further delivered through the cyclones $S_5$, $S_3$, $S_1$ and ducts $W_5$, $W_3$, $W_1$ of the first unit, and is discharged therefrom by the exhaust fan 25. While the exhaust gas from the boiler 2 passes through the ducts of the first unit, the exhaust gas preheats the powder raw material by heat-exchanging together with the hot gas from the rotary kiln 23. As mentioned above, the heat of the exhaust gas from the boiler 2 of the electric power generating device 1 is used as part of the heat source for preheating the cement powder raw material, so that the heat energy is saved.

The ash produced as a result of the combustion of coal is contained in the exhaust gas from the boiler 2 of the electric power generating device. The ash is delivered together with the exhaust gas through the duct $W_7$ of the first unit of the suspension preheater 21, in which the ash is joined to the powder raw material from the cyclone $S_4$, to the cyclone $S_5$ where the ash and the powder raw material are gathered. Thereafter, the ash together with the powder raw material is delivered through the raw material feed pipe $D_5$, the duct $W_8$, the cyclone $S_6$, the raw material feed pipe $D_6$, the duct $W_9$, the cyclone $S_7$, the raw material feed pipe $D_7$, the calcining furnace 22, the duct $W_{10}$, the cyclone $S_8$, and the raw material feed pipe $D_8$ to the rotary kiln 23. Thus, the ash is mixed with the powder raw material in the suspension preheater 21 and recovered as part of the resultant powder raw material. Therefore, no special equipment is required for gathering and recovering the ash, and as a result the cost of treating the ash is saved.

When coal is burned, a problem arises in the treatment of sulfur oxides contained in the exhaust gas. These sulfur oxides are delivered together with the exhaust gas to the suspension preheater 21, and are recovered by reacting with the raw material passing through the suspension preheater 21. More specifically, the cement raw material contains a large amount of calcium carbonate, and the calcium carbonate is preheated in the suspension preheater 21 so that part of it is decomposed into calcium oxide and carbon dioxide. The calcium oxide serves as a desulfurizing agent. More specifically, the above-mentioned sulfur oxides react with the calcium oxide, contained in the raw material escaping from the cyclone $S_7$ and the raw material fed from the cyclone $S_4$, in the duct $W_7$ and the cyclone $S_5$ to form calcium sulfide or calcium sulfate. The calcium sulfide or the calcium sulfate is gathered in the cyclone $S_5$ and is finally fed to the rotary kiln 23 as part of the powder raw material. Thus, the sulfur oxides contained in the exhaust gas from the boiler 2 of the electric power generating device 1 is recovered by the suspension preheater 21, and therefore no desulfurizing device is required. As a result, the overall construction cost of the electric power generating device and its operating cost are considerably reduced.

In the case where coal, the combustion rate of which is low, is used as the fuel, it is possible that an unburned coal remains in the exhaust gas. The unburned coal is delivered together with the exhaust gas to the suspension preheater 21 where it is completely burned.

Figure 2:
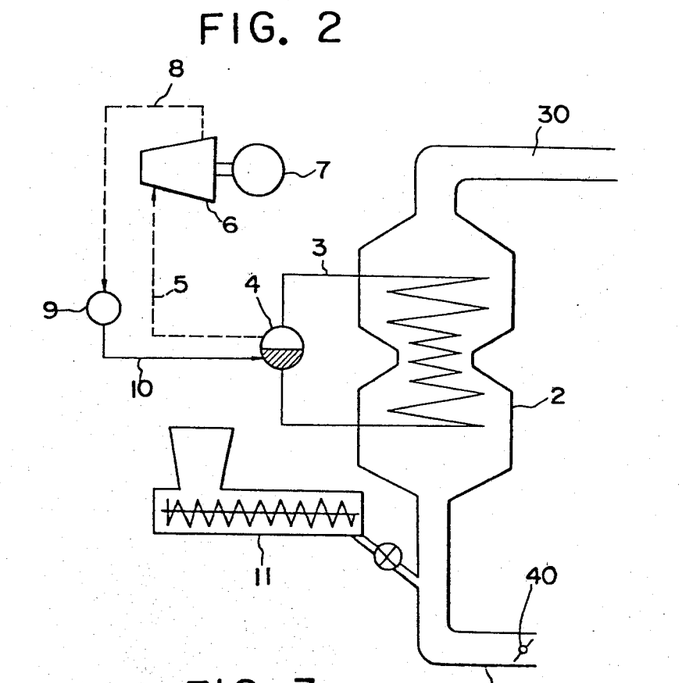
FIG. 2 is a diagrammatic elevational view of the electric power generating device having a modified boiler.

FIG. 2 shows a modified boiler 2. Those parts in FIG. 2, which are substantially the same as the parts in FIG. 1, are designated by like reference characters and are not described in detail. The same is true with the embodiments in FIGS. 3 to 12. As shown in FIG. 2, the boiler 2 has a reduced central portion whereby the resident time of coal in the boiler 2 is increased, so that even coal of which combustion rate is low or low grade coal can be completely burned. The boiler 2 may have more than two reduced portions. A control value 40 is provided in the duct 31 which connects the cooling device (not shown in FIG. 2) to the boiler 2. The control value 40 serves to control the flow rate of the hot air from the cooling device.

Figure 3:
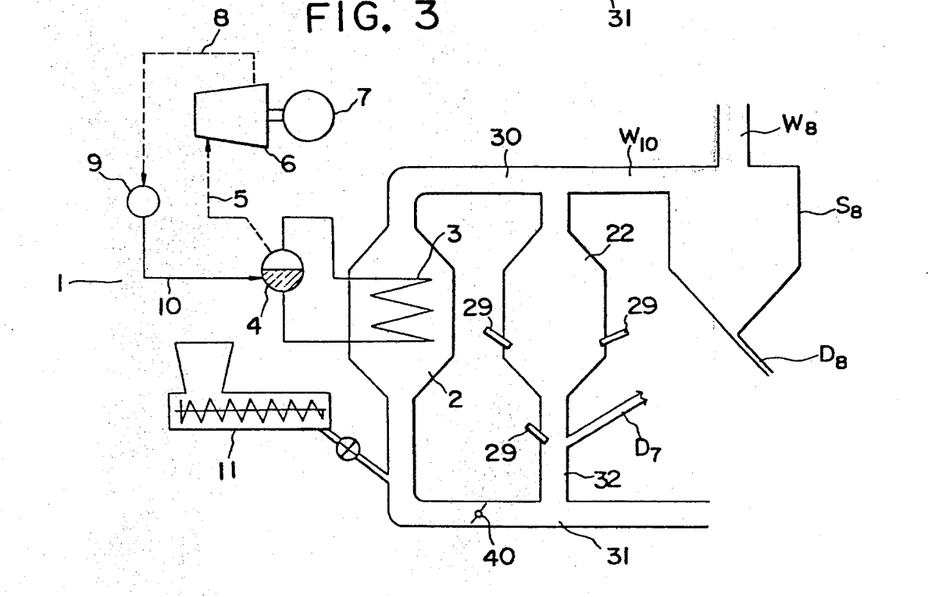
FIG. 3 is a diagrammatic elevational view of an apparatus for recovering exhaust gas from the boiler, the apparatus being provided in accordance with another embodiment of the invention in which the exhaust gas conduit is connected to a duct which connects a lowermost cyclone to a calcining furnace.

FIG. 3 shows another embodiment incorporating modifications of the apparatus shown in FIG. 1. In this embodiment, the conduit 30 for transferring the exhaust gas from the boiler 2 of the electric power generating device 1 is connected to the intermediate portion of the duct $W_{10}$ connected between the calcining furnace 22 and the lowermost cyclone $S_8$ of the second unit. The powder raw material, which has been completely decarbonated by being calcined in the calcining furnace 22 and contains a large amount of calcium oxide, meets the sulfur oxides in the exhaust gas, so that the recovery of the sulfur oxides is improved.

Figure 4:
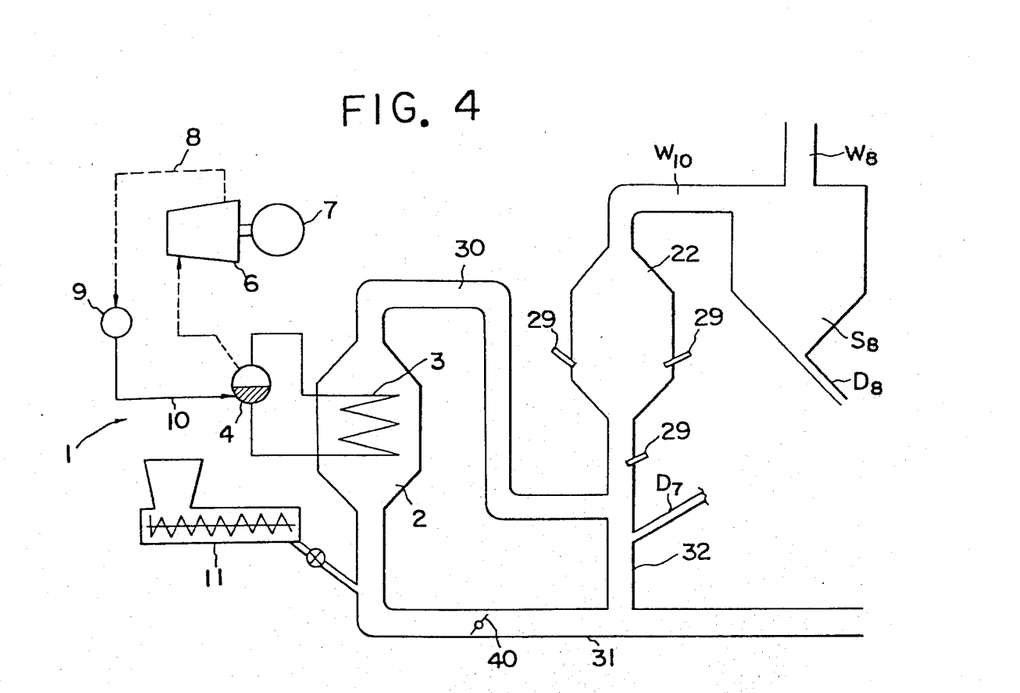
FIG. 4 is a diagrammatic elevational view of an apparatus provided in accordance with a further embodiment of the invention in which the exhaust gas is fed to the inlet of the calcining furnace through a conduit.

An embodiment shown in FIG. 4 incorporates modifications to achieve a purpose similar to that of the embodiment in FIG. 3. In this embodiment, the conduit 30 for transferring the exhaust gas from the boiler 2 is connected to the duct 32 arranged on the inlet side of the calcining furnace 22. The exhaust gas from the boiler 2 passes through the calcining furnace 22 and then through the ducts of the second unit of the suspension preheater 21. The sulfur oxides in the exhaust gas reacts with the calcium oxide of the raw material even in the calcining furnace 22 so that the recovery of the sulfur oxides is further improved. Further, in the case where unburned coal is contained in the exhaust gas, such unburned coal can be completely burned in the calcining furnace 22.

Figure 5:
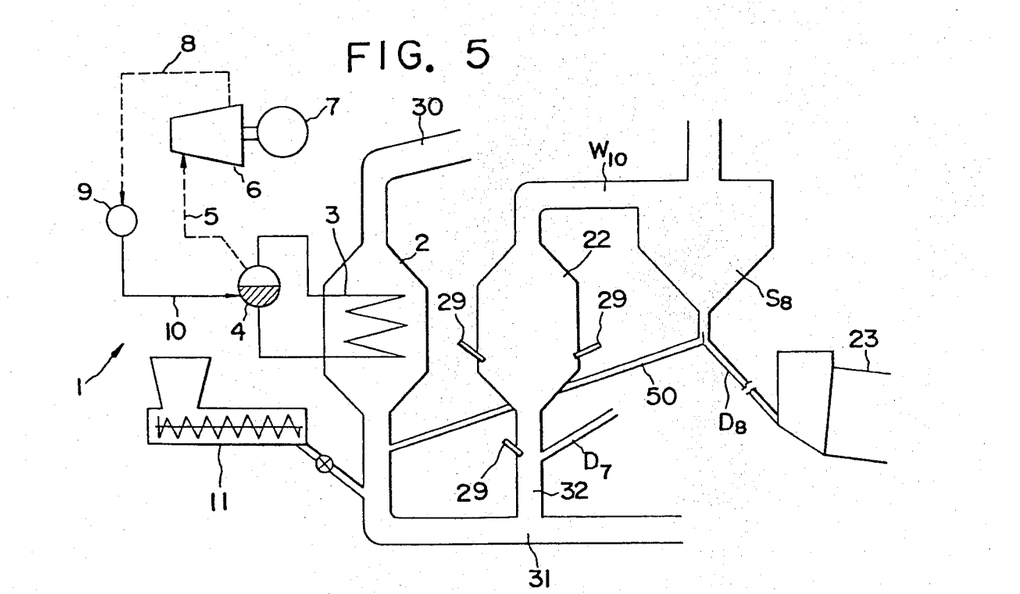
FIG. 5 is a diagrammatic elevational view of an apparatus provided in accordance with a still further embodiment of the envention in which part of the powder raw material is fed to the boiler of the electric power generating device.

When a certain kind of coal is burned, part of the resultant ash has a relatively low melting point. In this case, there is a risk that the ash is fused in the boiler 2 and adheres to the wall of the boiler 2. To overcome this difficulty, the cement powder raw material is fed to the boiler 2, as shown in an embodiment in FIG. 5. In FIG. 5, the bottom of the cyclone $S_8$ is connected to the inlet of the boiler 2 by a raw material feed pipe 50. Part of the powder raw material collecting in the cyclone $S_8$ is fed through the raw material feed pipe 50 to the boiler 2. The powder raw material supplied to the boiler 2 reacts with the ash so that compounds having a high melting point is produced. Thus, the compounds of a low melting point in the ash is converted into the compound of a high melting point so that the compounds of a low melting point is prevented from adhering to the inner wall of the boiler 2.

Figures 6, 7:
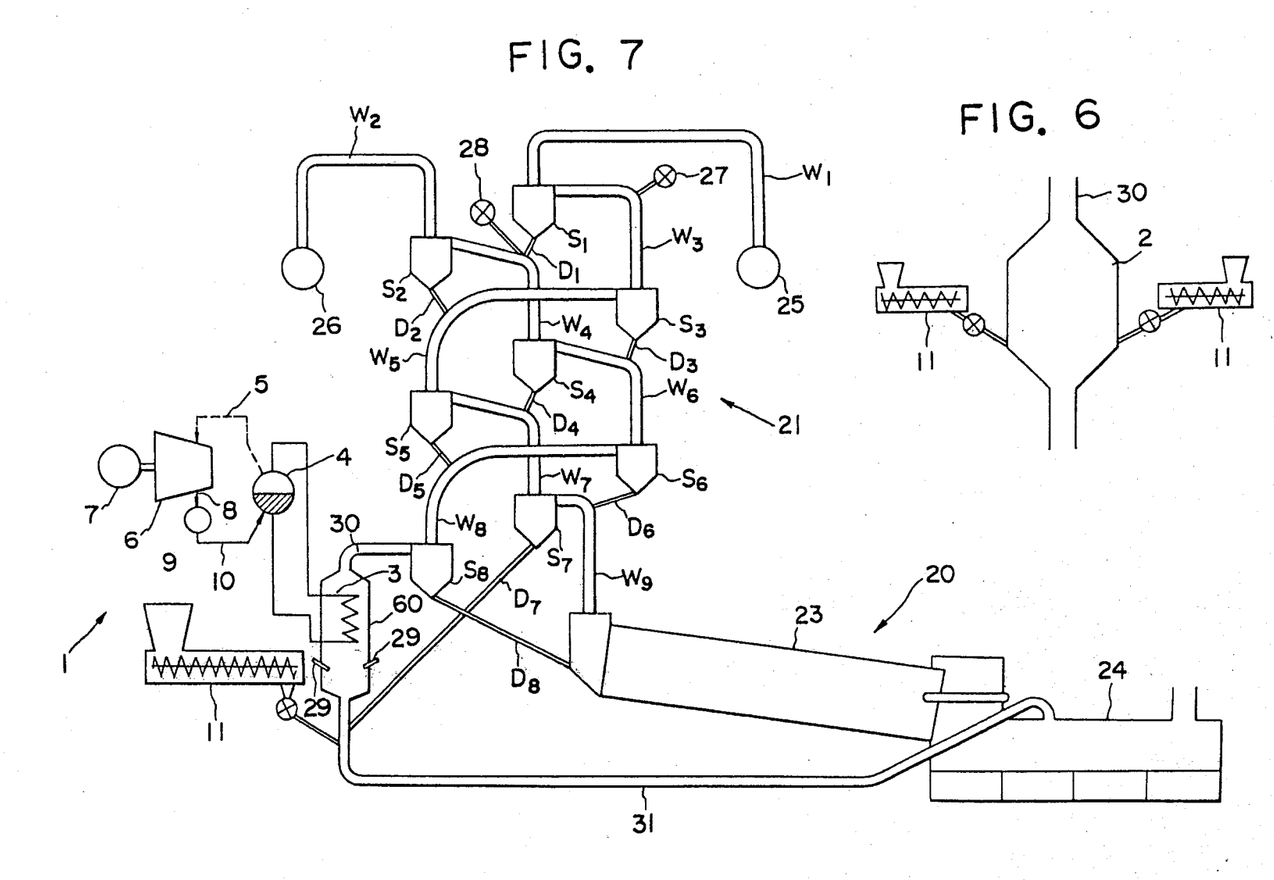
FIG. 6 is a diagrammatic elevational view of a modified boiler.
FIG. 7 is a diagrammatic elevational view of an apparatus provided in accordance with a still further embodiment of the invention in which a dual purpose furnace acts both as a boiler of the electric power generating device and as a calcining furnace.

The powder raw material may be fed together with the coal by the coal feeder 11 to the boiler 2. As shown in FIG. 6, two feeders 11, 11 may be provided for supplying a mixture of a coal and powder raw material. Also, coal may be supplied by one of the two feeders, and the powder raw material may be supplied by the other feeder.

In an embodiment shown in FIG. 7, there is provided a dual purpose furnace which acts both as a boiler of the thermal electric power generating device 1 and a calcining furnace of the suspension preheater 21. More specifically, a furnace conventionally used for calcining is here used as the dual purpose furnace 60 through which the water pipe 3 extends. Coal supplied from the coal feeder 11 is burned in the dual purpose furnace 60 so that steam is generated in the water pipe to produce electric power. The powder raw material fed from the cyclone S₇ through the raw material feed pipe D₇ is calcined in the dual purpose furnace 60. This embodiment has the advantage that the calcining of the powder raw material and the generation of steam are carried out at the same time in one furnace. Another advantage of this embodiment is that the recovery of sulfur oxides in the exhaust gas is relatively good as is the case with the embodiments in FIGS. 4 and 5. A further advantage is that the ash of a low melting point is prevented from being fused to the inner wall fo the furnace as described above for the embodiments in FIG. 5.

Figure 8:
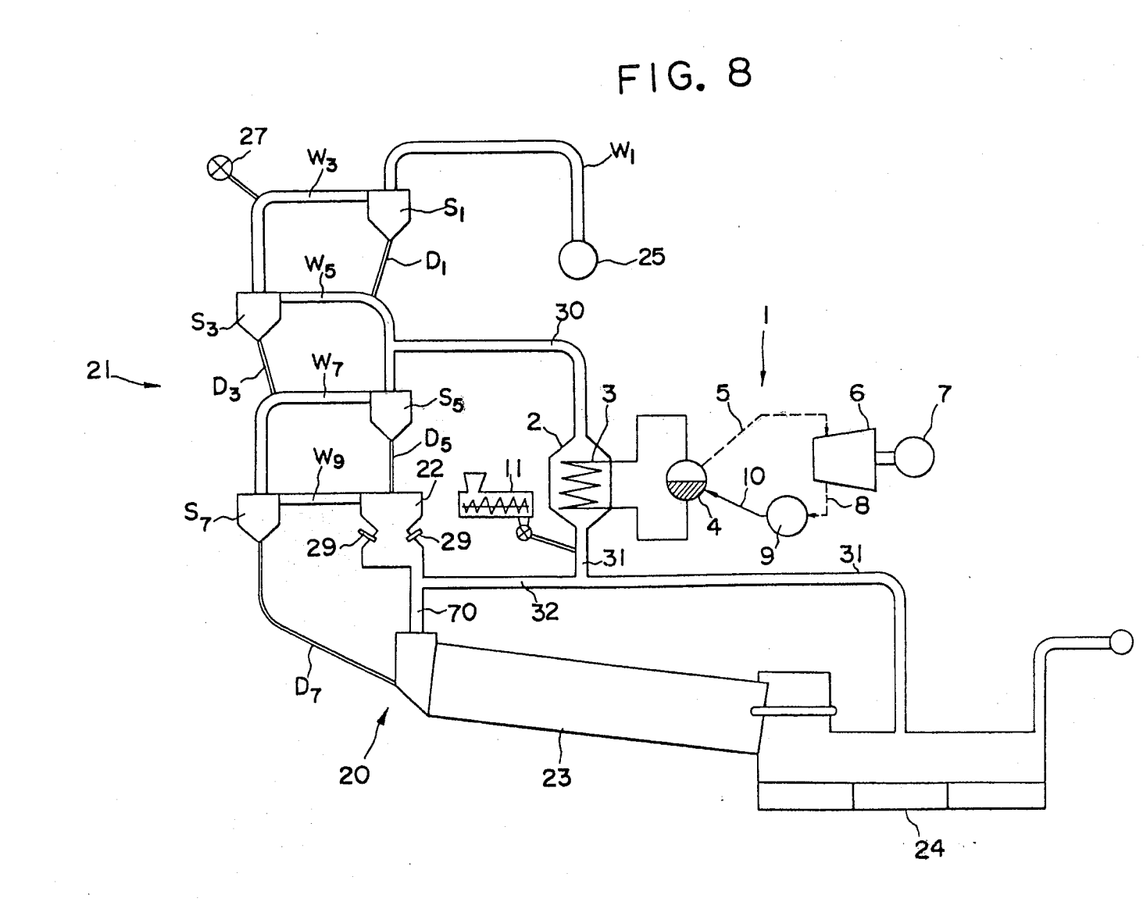
FIG. 8 is a diagrammatic elevational view of an apparatus provided in accordance with a still further embodiment of the invention in which a suspension preheater comprises one unit.

In an embodiment shown in FIG. 8, the suspension preheater 21 has one unit composed of ducts and cyclones. The conduit 30 for transferring the exhaust gas from the boiler 2 is connected to the duct W₅ of the suspension preheater 21. The hot air from the cooling device 24 is delivered to the calcining furnace 22 through the ducts 31, 32 and the hot gas from the rotary kiln 23 is delivered to the calcining furnace through the duct 70.

Figure 9:
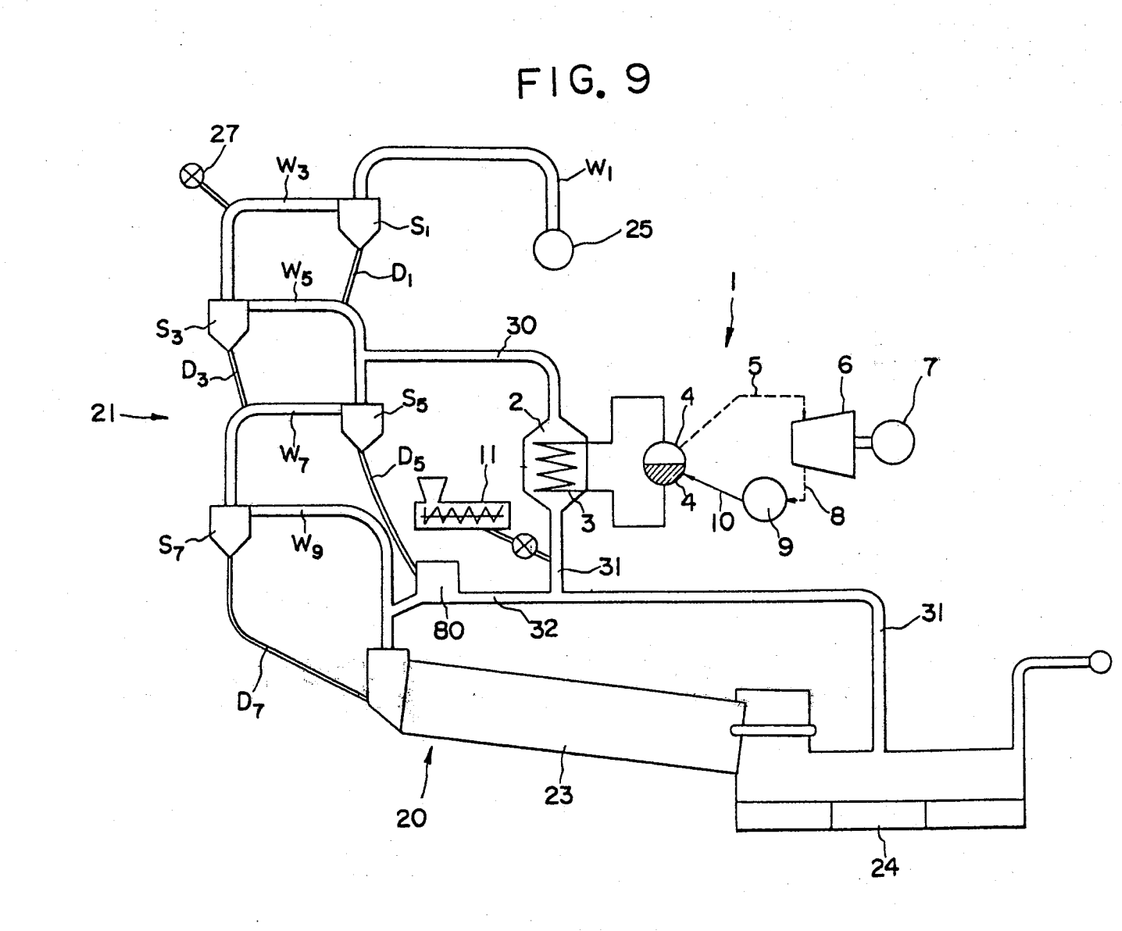
FIG. 9 is a diagrammatic elevational view of an apparatus provided in accordance with a still further embodiment of the invention in which a suspension preheater comprises one unit and in which not calcining furnace is provided.

An embodiment shown in FIG. 9 is similar to the embodiment in FIG. 8. In this embodiment, the calcining furnace in the embodiment in FIG. 8 is not provided, and instead a resident chamber 80 is provided. The powder raw material is fed from the cyclone S₅ through the raw material feed pipe D₅ to the resident chamber 80 in which the raw material is stirred and heated by the hot air from the cooling device 24. The raw material is then delivered by this hot air to the duct W₉ and is further delivered to the rotary kiln 23 through the cyclone S₇ and the raw material feed pipe D₇.

Figure 10:
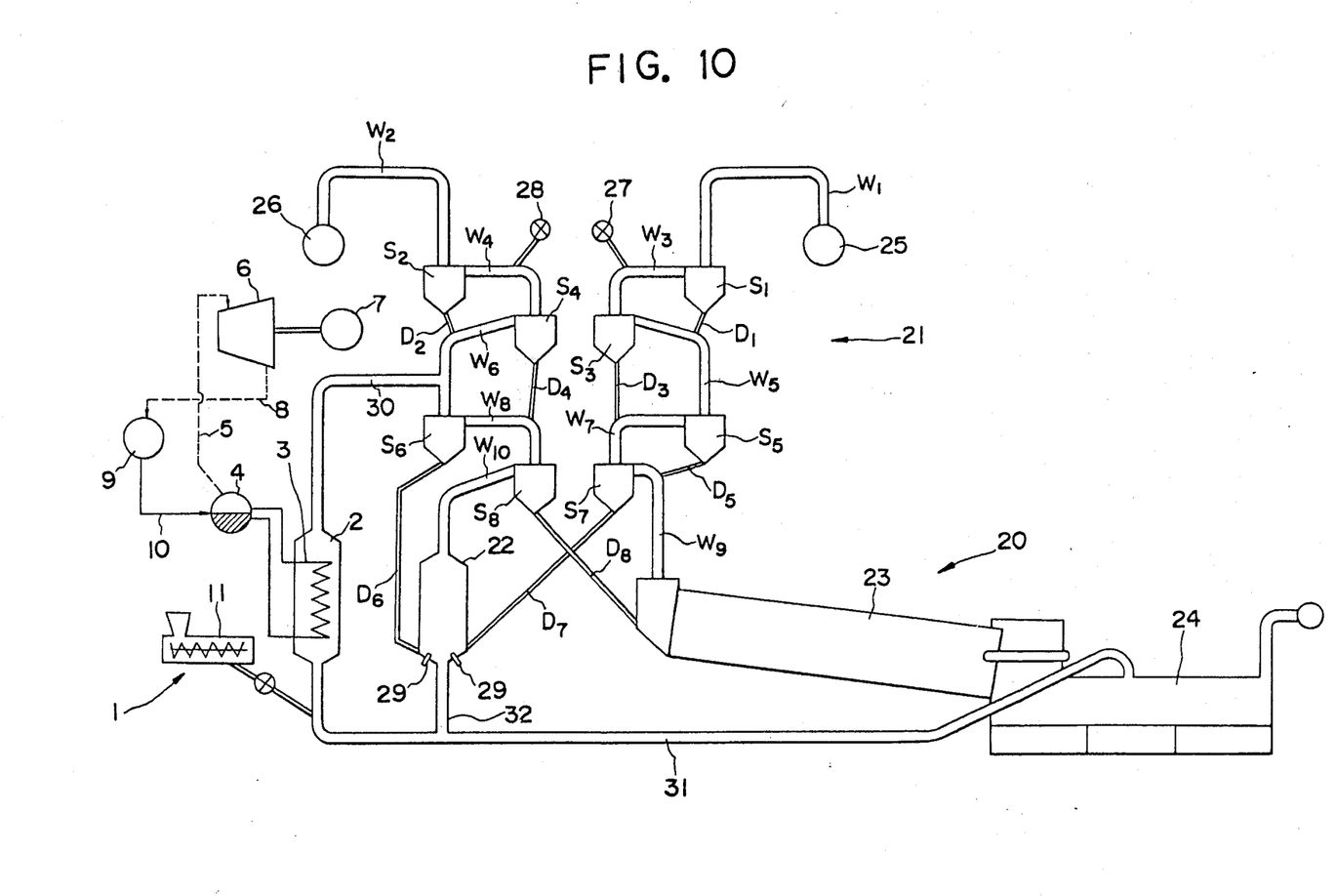
FIG. 10 is a diagrammatic elevational view of an apparatus provided in accordance with a still further embodiment of the invention in which a suspension preheater comprises two units and in which the ducts and cyclones of the two units are independent of one another except for the lowermost ones.

In an embodiment shown in FIG. 10, the suspension preheater comprises two units each consisting of ducts and cyclones, the two units being independent of each other except for their lower portions. The powder raw material supplied by the raw material supplying device 27 of the first unit is fed through the ducts, cyclones and raw material feed pipes of the first unit to the cyclone S₇. The raw material is further delivered from the cyclone S₇ to the calcining furnace 22 through the raw material feed pipe D₇. On the other hand, the powder raw material supplied from the raw material supplying device 28 of the second unit is fed through the ducts, cyclones and raw material feed pipes of the second unit to the cyclone S₆. The raw material is further delivered from the cyclone S₆ to the calcining furnace 22 through the raw material feed pipe D₆. The raw material fed to the calcining furnace 22 in the abovementioned manner is calcined therein and then is delivered to the rotary kiln 23 through the duct W₁₀, the cyclone S₈ and the raw material feed pipe D₈. The conduit 30 for transferring the exhaust gas from the boiler 2 of the electric power generating device 1 is connected to the duct of one of the two unit, i.e., the duct W₆ of the second unit. The ash in the exhaust gas is arrested by the cyclones of the second unit.

Figure 11:
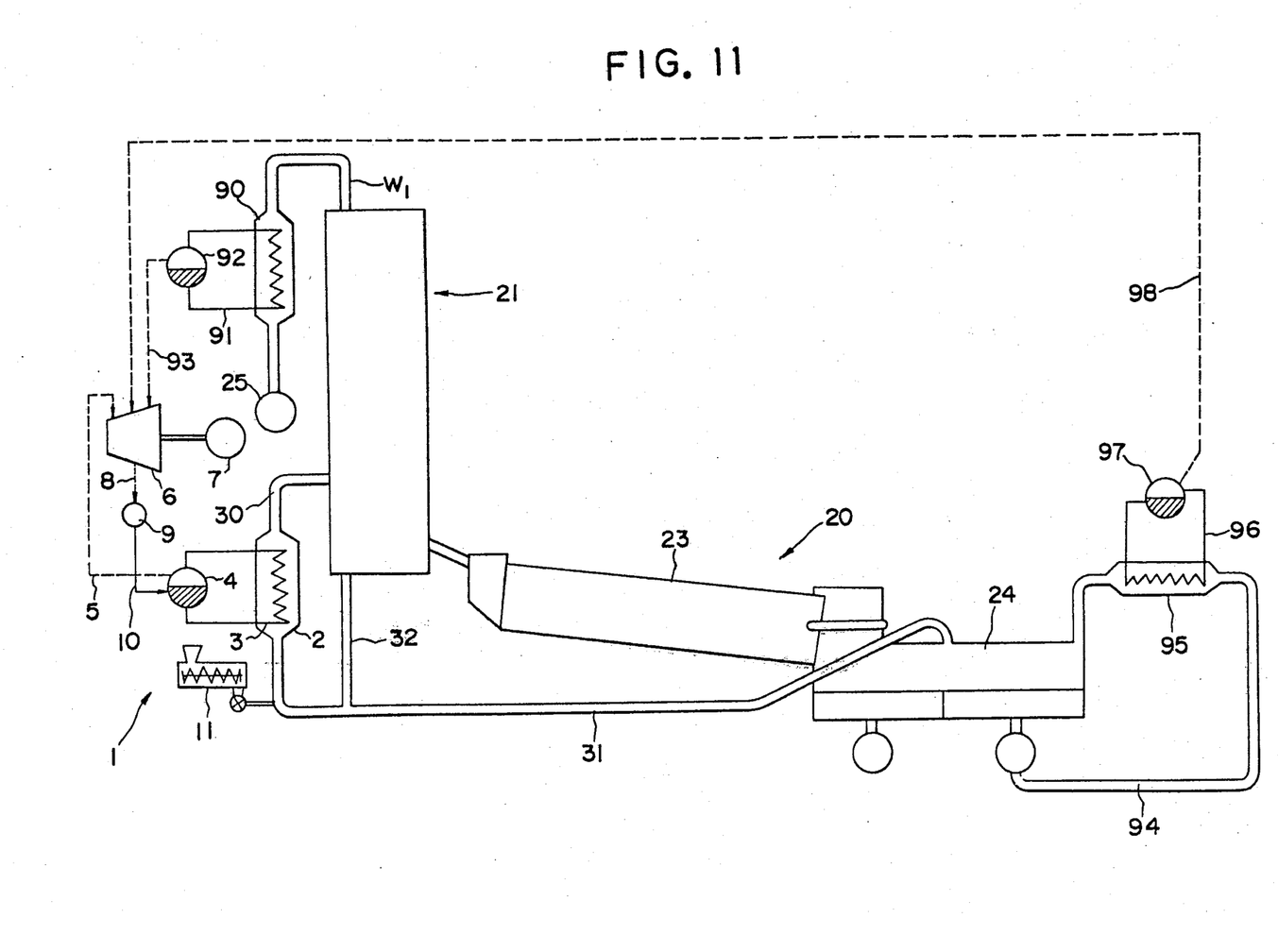
FIG. 11 is a diagrammatic elevational view of an apparatus provided in accordance with a still further embodiment ot the invention in which a suspension preheater is indicated by a block and in which exhaust gas from the suspension preheater and exhaust gas from a cooling device are used as a heat source for operating an electric power generating device.

In an embodiment shown in FIG. 11, an auxiliary boiler 90 is provided in a duct W₁ through which the exhaust gas from the suspension preheater 21 passes. A water pipe 91 extends through the auxiliary boiler 90, and water passing through the water pipe 91 is heated by the exhaust gas from the suspension preheater 21 and converted into steam. The steam is delivered to a steam turbine 6 of the electric power generating device 1 through a drum 92 and a steam pipe 93. On the other hand, another auxiliary boiler 95 is provided in an exhaust pipe 94 through which the exhaust gas from the cooling device 24 passes. A water pipe 96 extends through the auxiliary boiler 95. Water passing through the water pipe 96 is heated by the exhaust gas from the cooling device 24 and converted into steam. The steam is delivered to the steam turbine 6 of the electric power generating device 1 through a drum 97 and a steam pipe 98. Thus, not only the steam generated by the main boiler 2 but also the steam generated by the exhaust gas from the suspension preheater 21 and the steam generated by the exhaust gas from the cooling device 24 are fed to the steam turbine 6. Therefore, a greater power capacity is achieved. Usually, since the enthalpy of the steam generated by the two auxiliary boilers 90, 95 is smaller than the enthalpy of the steam generated by the main boiler 2, the steam from the auxiliary boilers 90, 95 are fed to the later stages of the steam turbine 6. In FIG. 11, the suspension preheater 21 is indicated by a block, and detailed construction thereof is not shown. The suspension preheater in FIG. 11 is similar to the suspension preheater of FIG. 8 which has one unit, but is not restricted to such a construction and may further include a second unit.

Figure 12:
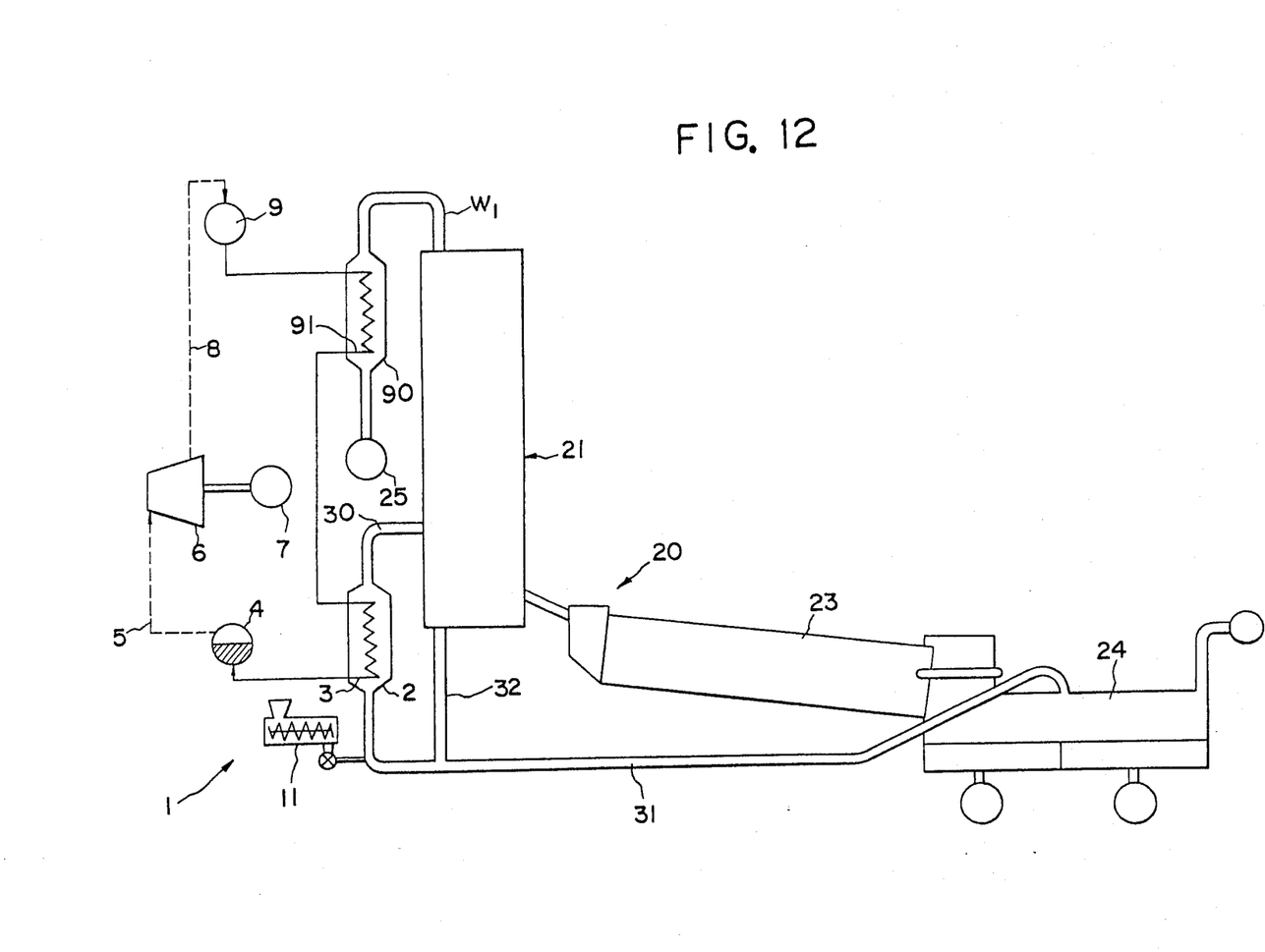
FIG. 12 is a diagrammatic elevational view of an apparatus provided in accordance with a still further embodiment of the invention in which a suspension preheater is indicated by a block as in FIG. 11 and in which exhaust gas from the suspension preheater is used as a heat source for operating an electric power generating device.

In an embodiment shown in FIG. 12, the water pipe 91, arranged within the auxiliary boiler 90 to which the exhaust gas from the suspension preheater 21 is fed, is connected in a continuous manner to the water pipe 3 arranged within the main boiler 2. The steam generated in the water pipe 91 of the auxiliary boiler 90 is fed to the water pipe 3 of the main boiler 2 in which the steam gets hotter. This steam is fed to the steam turbine 6.

In the present invention, a combustible solid material such as waste asphalt, oil shale, muddy waste oil, waste tires and a wooden material as well as coal, a combustible liquid material such as heavy oil and waste oil, and natural gas can be used as a fuel.

The powder raw material which serves to recover sulfur oxides is not restricted to cement powder raw material as in the above embodiments. For example, any raw material, such as limestone raw material and dolomite raw material, which can react with sulfur to provide a reaction product which will not affect the raw material.

What is claimed is:

1. Apparatus for recovering exhaust gas which comprises a powder raw material sintering device and a thermal electric power generating device, said sintering device comprising a preheat section, a calcining section and a cooling section, said electric power generating device comprising a boiler, a heat exchange water pipe passing through said boiler, a turbine and an electric power generator, and the exhaust gas outlet of said boiler being connected to said preheat section of said sintering device through an exhaust gas conduit.

2. Apparatus according to claim 1, in which said cooling section of said sintering device is connected to the inlet of said boiler through a duct so that hot air from said cooling section is fed through said duct to said boiler whereby a combustible material is burned by the hot air in said boiler.

3. Apparatus according to claim 1, in which said preheat section of said powder raw material sintering device comprises a suspension preheater which comprises at least one unit composed of a group of ducts and a group of cyclones each disposed between the adjacent ducts.

4. Apparatus according to claim 3, in which said suspension preheater further includes a calcining furnace.

5. Apparatus according to claim 3, in which said exhaust gas conduit for transferring the exhaust gas from said boiler is connected to the duct of said suspension preheater.

6. Apparatus according to claim 4, in which said exhaust gas conduit is connected to the duct connected between the lowermost cyclone and said calcining furnace.

7. Apparatus according to claim 4, in which said exhaust gas conduit is connected to the inlet of said calcining furnace.

8. Apparatus according to claim 4, in which said calcining furnace also performs the same function that said boiler of said electric power generating device does.

* * * * *